United States Patent
Morales

(10) Patent No.: US 7,773,242 B2
(45) Date of Patent: Aug. 10, 2010

(54) AUTOMATED REMOTE CORRECTION OF PREFLIGHT DEFECTS

(75) Inventor: Javier Morales, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 1528 days.

(21) Appl. No.: 11/098,128

(22) Filed: Apr. 4, 2005

(65) Prior Publication Data

US 2006/0221381 A1  Oct. 5, 2006

(51) Int. Cl.
G06K 15/00 (2006.01)
(52) U.S. Cl. .................. 358/1.14; 358/1.15; 358/1.18
(58) Field of Classification Search .............. 358/1.14, 358/1.15, 1.18
See application file for complete search history.

(56) References Cited

U.S. PATENT DOCUMENTS

| | | | | |
|---|---|---|---|---|
| 5,396,626 | A * | 3/1995 | Nguyen | 717/171 |
| 5,436,730 | A * | 7/1995 | Hube | 358/401 |
| 5,625,757 | A * | 4/1997 | Kageyama et al. | 358/1.14 |
| 5,687,259 | A * | 11/1997 | Linford | 382/294 |
| 5,963,641 | A | 10/1999 | Crandall et al. | 380/2 |
| 5,990,907 | A * | 11/1999 | Colletti | 345/467 |
| 6,111,654 | A * | 8/2000 | Cartier et al. | 358/1.16 |
| 6,115,132 | A * | 9/2000 | Nakatsuma et al. | 358/1.14 |
| 6,414,755 | B1 * | 7/2002 | Bronstein et al. | 358/1.15 |
| 6,429,947 | B1 * | 8/2002 | Laverty et al. | 358/1.15 |
| 6,608,697 | B1 * | 8/2003 | Schorr et al. | 358/1.15 |
| 6,801,333 | B1 | 10/2004 | Weiss | 358/1.15 |
| 7,146,542 | B2 * | 12/2006 | Srinivasan et al. | 714/44 |
| 7,284,190 | B2 * | 10/2007 | Chellis et al. | 715/229 |
| 2002/0159084 | A1 * | 10/2002 | Daniels et al. | 358/1.11 |
| 2003/0061357 | A1 * | 3/2003 | Hertling et al. | 709/227 |
| 2003/0174347 | A1 * | 9/2003 | Gonzalez et al. | 358/1.6 |
| 2003/0184784 | A1 * | 10/2003 | Ferlitsch | 358/1.13 |
| 2004/0160624 | A1 * | 8/2004 | Elgar et al. | 358/1.15 |
| 2005/0030578 | A1 * | 2/2005 | Wiechers | 358/1.15 |
| 2006/0007466 | A1 * | 1/2006 | Ben-Yehuda et al. | 358/1.13 |
| 2006/0114490 | A1 * | 6/2006 | Rolleston | 358/1.14 |

OTHER PUBLICATIONS

Extensis Preflight Pro User Guide Version 2.1 for Macintosh, Extensis Corporation, published 1998, pp. 1-8, 24-25, 34, 63-64, 73-75, 87, 97.*

* cited by examiner

Primary Examiner—Benny Q Tieu
Assistant Examiner—Paul F Payer
(74) Attorney, Agent, or Firm—Alix, Yale & Ristas, LLP

(57) ABSTRACT

A method of automatic correction of preflight defects located in print jobs submitted by print buyers to a print vendor through the Internet. The defect correction routine determines whether the print job files are non-compliant with an associated file format supported by the preflight system in a manner that can be automatically corrected, and initiates an auto-correct subroutine if the print job file content is non-compliant. The routine queries whether the print job file is missing any resources, and initiates an obtain resources subroutine if the print job file is missing resources. The routine queries whether the print job files include defects that can be manually corrected, and initiates a manual-correct subroutine if the print job files include such defects. The routine sends the print job to the workflow if no manual corrections are required.

19 Claims, 5 Drawing Sheets

AUTOMATED REMOTE CORRECTION OF PREFLIGHT DEFECTS

BACKGROUND OF THE INVENTION

This invention relates generally to preflight systems that allow a print buyer to submit a print file for preflighting from a remote user interface. More particularly, the present invention relates to a method for automatically correcting preflight defects and eliminating the need for print shop employee intervention.

Preflighting is the process of reviewing print information for errors or possible printing problems before actually printing the information. This process is important because a printing press can be very expensive to set up and run. Further, a print run may require hundreds of thousands of sheets of paper, special binding procedures, etc. If errors or problems in a print job are not caught before the printing job is completed, it can be very costly to reprint the job.

Print buyers who wish to have something printed may submit the print job in digital form to a print vendor (e.g., a printer with a printing press or a print broker who passes the item on to a printer with a printing press). In theory, this allows the print file containing the item to be easily preflighted by a preflight system through computer analysis, but this has not worked out in practice. For the purpose of further discussion herein, the terms "preflight system" shall include a computer system located at the print vendor having a memory for storing an operating system, print source application support files, print job files submitted by print buyers, and other data required to support operation of the preflight system. While the print vendor can preflight the print file, the print vendor generally cannot correct all of the errors that are detected. Instead, to correct most errors, the print vendor must either return the print file to the print buyer or obtain additional information from the print buyer. This can significantly delay printing of the item.

The print buyer, on the other hand, may not be aware of the need to preflight a print file before submitting it to a print vendor. Even if a print buyer is sophisticated enough to appreciate the need for preflighting, the preflighting process is still time consuming for the print buyer. The print buyer must obtain a preflighting program, preflight the print file, and correct any detected errors before submitting the print file to a print vendor. If the print buyer obtains the preflighting program criteria from a source other than the print vendor being used by the print buyer, then the preflighting may not recognize possible print errors that are specific to the print vendor. Accordingly, the print buyer must obtain preflighting criteria for each new print vendor it employs.

Conventional preflight systems generally handle certain errors in one of two ways. They either automatically correct the error or display a message to the user explaining the problem with the job and maybe some suggestions on corrective action. U.S. Pat. No. 5,963,641 to Crandall et al., published Oct. 5, 1999; U.S. Pat. No. 6,414,755 to Bronstein et al., published Jul. 2, 2002; U.S. Pat. No. 6,608,697 to Schorr et al., published Aug. 19, 2003; and U.S. Pat. No. 6,801,333 to Weiss, published Oct. 5, 2004 disclose such conventional preflight systems. These mechanisms work well enough, however, they are insufficient to completely eliminate print shop employee intervention if the jobs submitted by the customer have problems that cannot be resolved either automatically or by a customer with limited prepress knowledge. For example, a customer that does not know how to find a font in their system is unlikely to be able to provide fonts missing from a submitted job.

SUMMARY OF THE INVENTION

In accordance with the present invention there is provided a method of automatic correction of preflight defects located in print jobs submitted by print buyers to a print vendor through the Internet, where each print job includes at least one print job file, the print vendor has a preflight system including a memory for storing information associated with print job file formats supported by the preflight system, a defect correction routine for performing the method, and the print job files. The defect correction routine comprises assigning a job ID to the print job, determining the format of the print job files, comparing the print job files to the file formats supported by the preflight system, determining whether the print job files are non-compliant with an associated file format supported by the preflight system in a manner that can be automatically corrected, initiating an auto-correct subroutine if the print job file content is non-compliant with the associated file format in a manner that can be automatically corrected, querying whether the print job file is missing any resources, initiating a obtain resources subroutine if the print job file is missing resources, querying whether the print job files include defects that can be manually corrected, initiating a manual-correct subroutine if the print job files include defects that can be manually corrected, and sending the print job to the printer if no manual corrections are required.

The auto-correct subroutine comprises creating a new auto-corrected print job file conforming the structure of the non-compliant print job file with the associated file format, querying the print buyer to accept the auto-corrected print job file, and terminating the print job if the print buyer does not accept the auto-corrected print job file, or returning to the defect correction routine if the print buyer accepts the auto-corrected print job files.

The auto-correct subroutine also comprises retaining the non-compliant print job file and presenting the user the uncorrected non-compliant print job files and the auto-corrected print job files when querying the print buyer.

The obtain resources subroutine comprises the preflight system querying the print buyer's computer for the missing resources, and prompting the print buyer to allow the print buyer's computer to upload the missing resource, if the missing resource is located on the print buyer's computer, or prompting the print buyer to find the missing resources, if the missing resource is not located on the print buyer's computer.

The obtain resources subroutine also comprises uploading the missing resources located on the print buyer's computer or found by the print buyer, the preflight system adding the missing resources to the print job files and resubmitting the print job.

The manual-correct subroutine comprises the preflight system determining whether the preflight system supports the print job file format, and terminating the print job if the print job file format is not supported by the preflight system or generating print job and application specific scripts to correct the defects if the print job file format is supported by the preflight system.

The manual-correct subroutine also comprises the preflight system transmitting the scripts to the print buyer's computer and the print buyer's computer executing the scripts to correct the defects. The preflight system prompts the print buyer to approve upload of the corrected print job files and the print buyer's computer uploads the corrected print job files as a new print order submittal.

DETAILED DESCRIPTION OF THE PREFERRED EMBODIMENT

Figure 5:
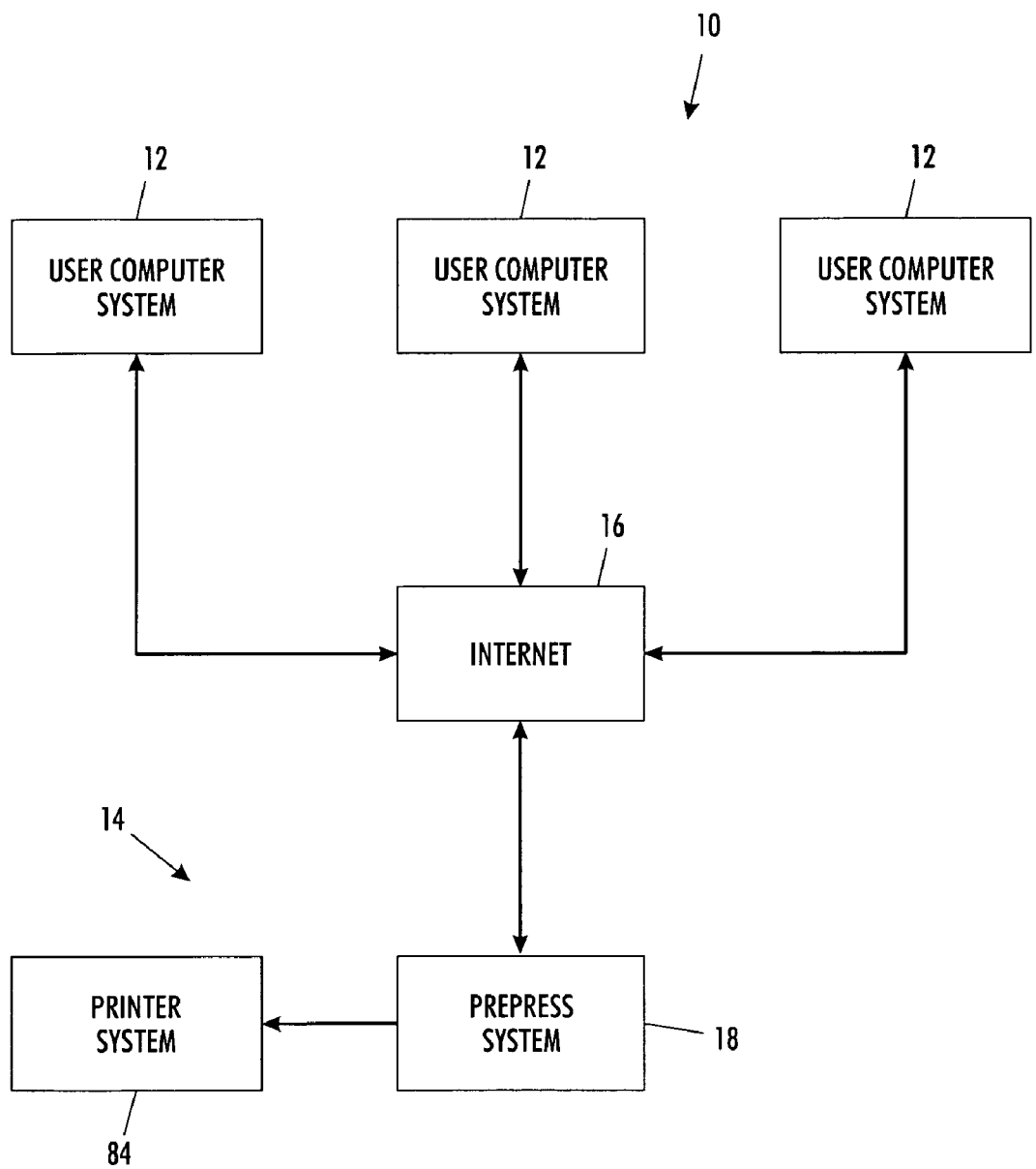
FIG. 5 is a schematic diagram of multiple print buyer computer systems connected to a preflight system utilizing the method of FIG. 1.

With reference to the drawings wherein like numerals represent like parts throughout the several figures, a method of automatic remote correction of preflight defects 10 in accordance with the present invention works in conjunction with systems that allow print shop customers to submit jobs for printing at the print shop. With reference to FIG. 5, these systems are usually web based (alternate delivery mechanisms are a possibility—e.g. email, IM, P2P networks, bidirectional print submission), with the print buyer or user 12 submitting the print job to the print vendor 14 via the Internet 16.

The subject method of automatic remote correction of preflight defects enables print buyers/users with limited prepress/preflight knowledge to correct job problems that cannot be automatically corrected by conventional preflight systems. The method of automatic remote correction of preflight defects is applicable for common print job problems, including but not limited to 1) problems that could be automatically corrected, but at some impact to the document's appearance (e.g. font substitution); jobs with missing resources (e.g. missing images for source files, missing fonts in PDLs); and job problems that need to be corrected by manual intervention in the source application (e.g. no bleeds on document).

Figure 1:
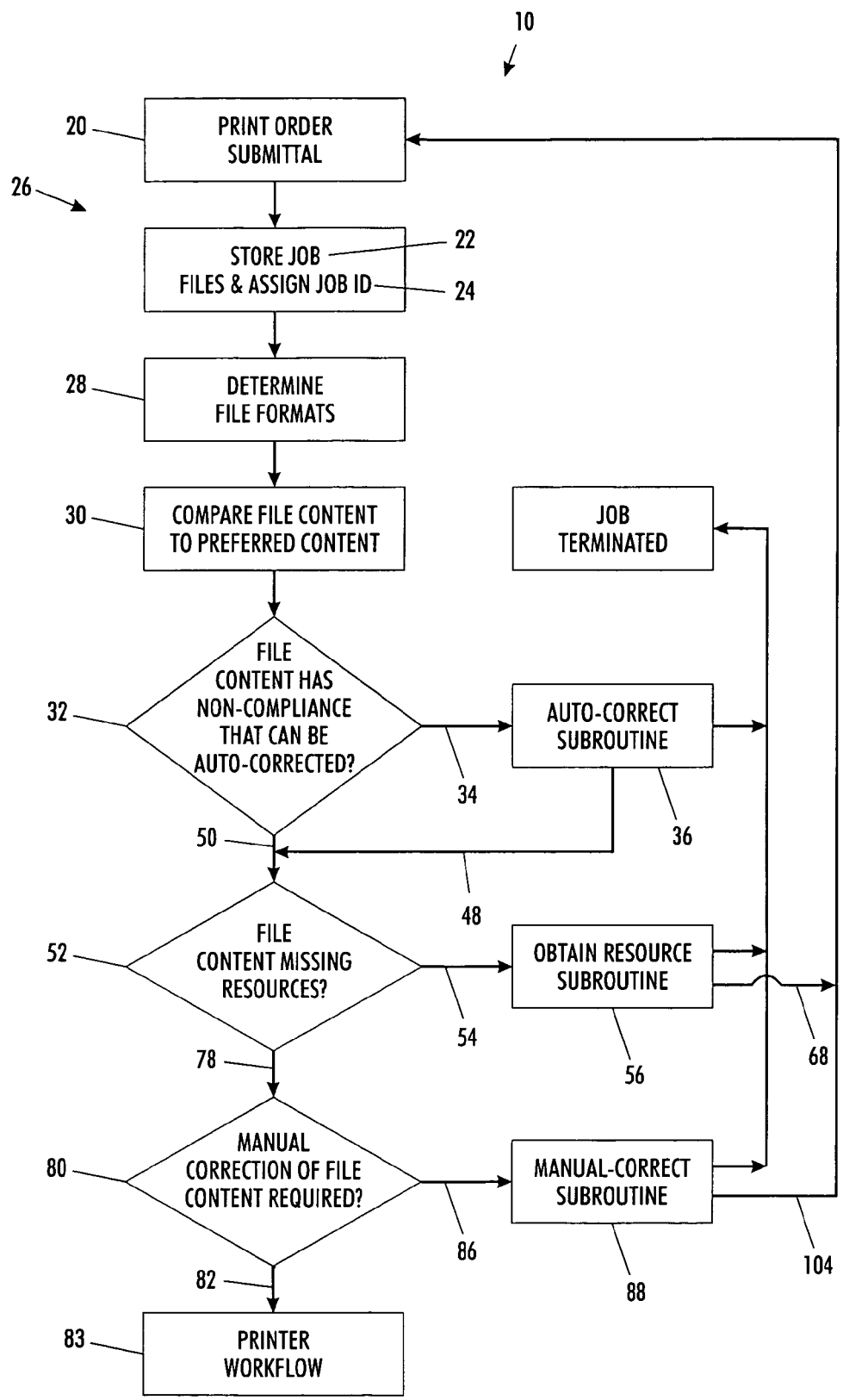
FIG. 1 is a flow diagram of a method of automatic remote correction of preflight defects in accordance with the invention.
Figure 2:
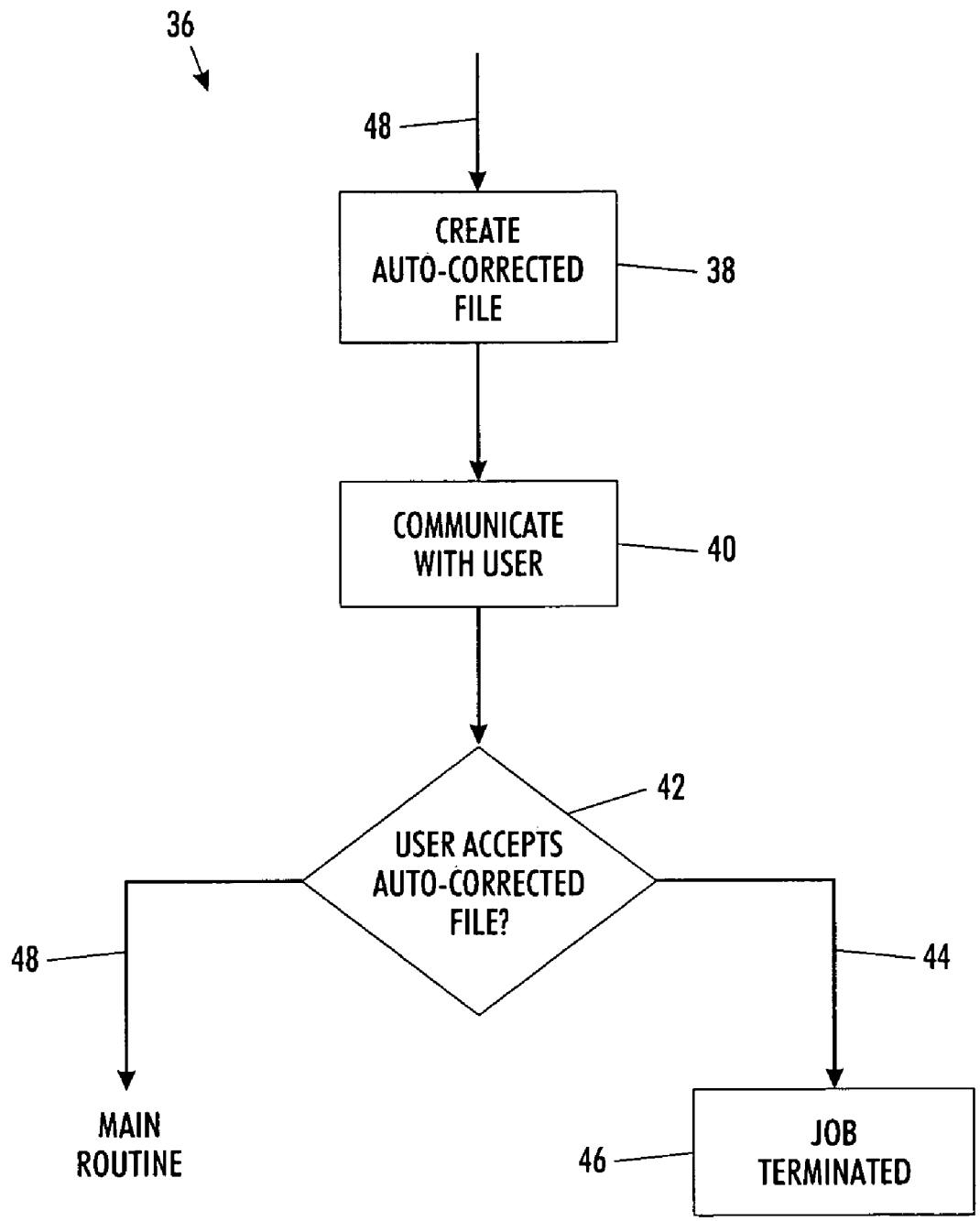
FIG. 2 is a flow diagram of the auto-correct subroutine of FIG. 1.
Figure 3:
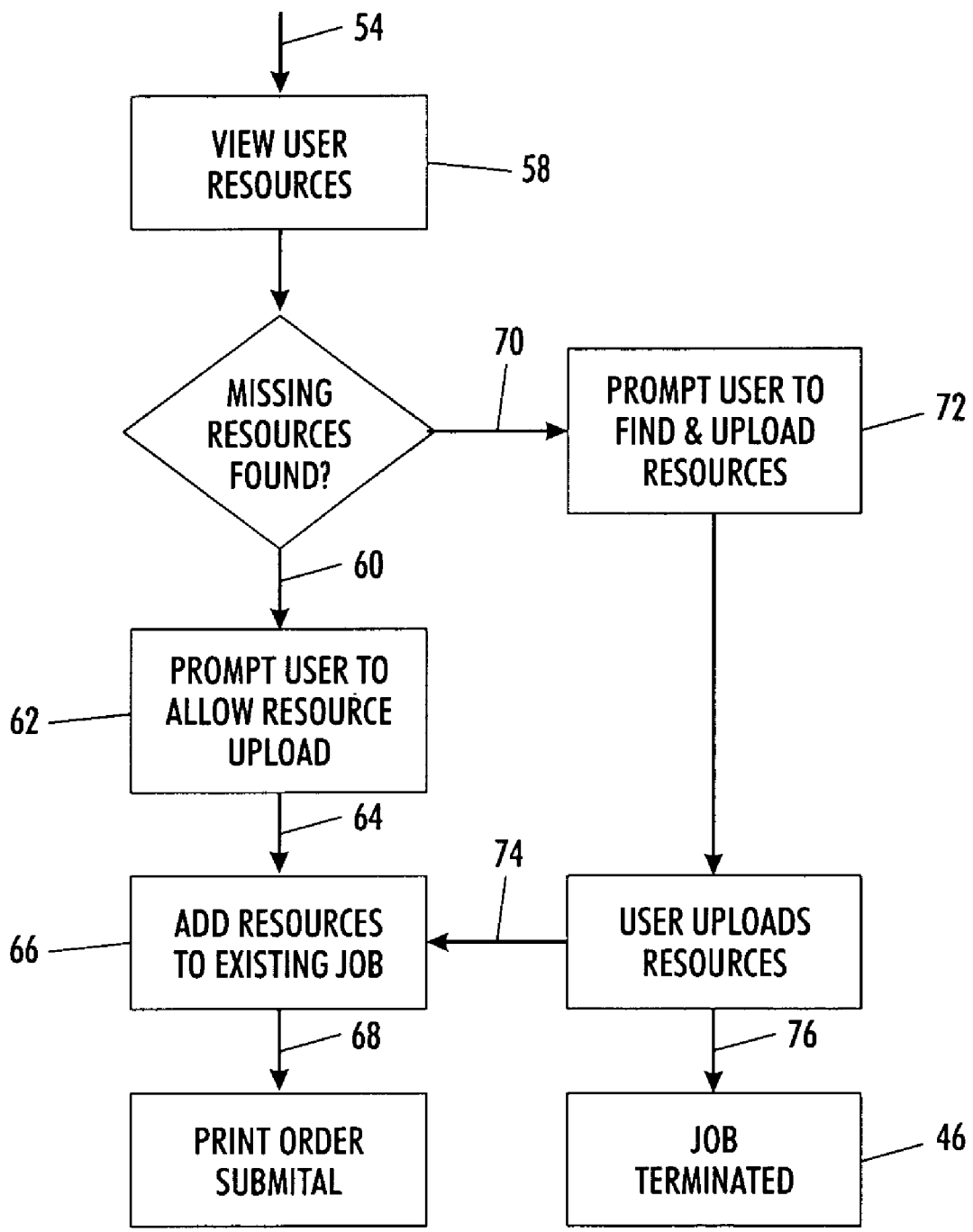
FIG. 3 is a flow diagram of the obtain resource subroutine of FIG. 1.
Figure 4:
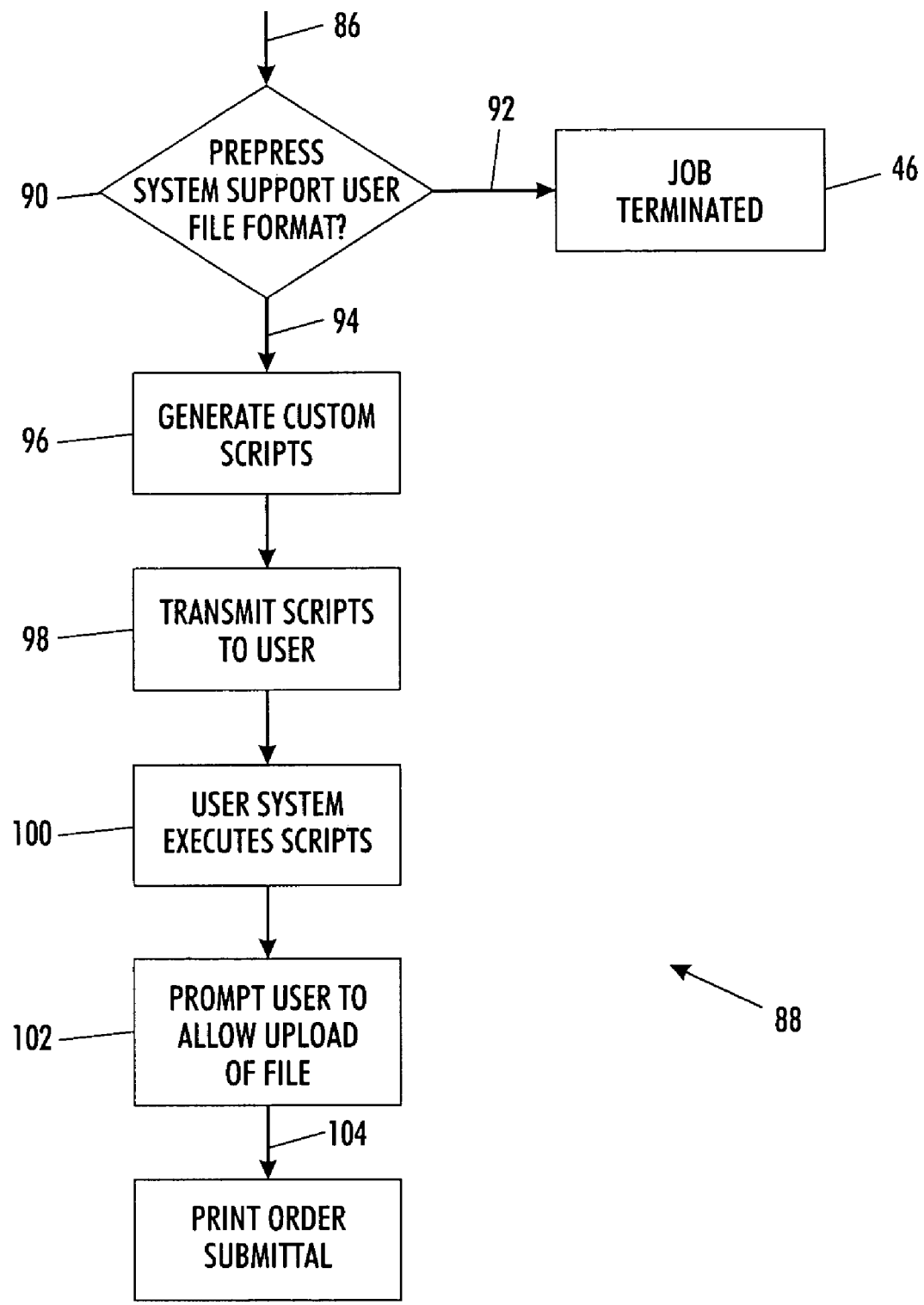
FIG. 4 is a flow diagram of the manual-correct subroutine of FIG. 1.

In the subject method of automatic remote correction of preflight defects (FIGS. 1-4), the print buyer/user 12 submits 20 a print order to the print vendor 14 in a conventional manner. For example, the user 12 may upload a file in PDF format containing a document originally created in InDesign and request that the document be printed in oversize paper and them trimmed down. The preflight system 18 stores 22 the print job files and assigns 24 a job ID, in a conventional manner. In the case of the example, the preflight system 18 would store 22 the PDF file and the request for trimmed oversized prints. With reference to FIG. 1, a defect correction routine 26 stored in the preflight system 18 then analyzes the print job files and identifies and corrects common print job errors, as described below.

The defect correction routine 26 initially examines the print job files to determine 28 the format of the files and compares 30 the print job file contents to the file formats supported by the preflight system 18. More specifically, print job files may be submitted in one of a number of file types and, generally, only a limited set of these file types are supported by any given preflight system 18. Then the defect correction routine 26 determines 32 whether the print job file content is non-compliant with the file structure of the associated file type in a manner that can be automatically corrected. If the print job file content is non-compliant with the associated file type in a manner that can be automatically corrected 34, the defect correction routine 26 initiates the auto-correct subroutine 36.

In the auto-correct subroutine 36, the preflight system 18 retains the original print job file and creates 38 a new auto-corrected file, conforming the structure of the print job file with that of one of the supported file types. The preflight system 18 then sends a message 40 to the user that there were problems with the submitted job that could be automatically corrected at the risk of altering the appearance of the document. The preflight system 18 presents the user the uncorrected original version of the print job and the auto-corrected version of the print job, and queries 42 whether or not the auto-corrected version is acceptable. If the print buyer/user refuses 44 to accept the auto-corrected version of the print job, the print job is terminated 46. If the print buyer/user accepts 48 the auto-corrected version, the auto-correct subroutine 36 is completed and returns to the defect correction routine 26.

If the print job file content is not non-compliant with the associated file type in a manner that can be automatically corrected 50, or if the print buyer/user accepts 48 the auto-corrected version and the auto-correct subroutine is completed, the defect correction routine 26 queries 52 whether the print job file is missing any resources. If the print job file is missing resources 54, the defect correction routine 26 initiates the obtain resources subroutine 56.

In the obtain resources subroutine 56, the preflight system 18 queries 58 the print buyer's computer 12 to determine whether it has the missing resources. For example, if the print job is missing a linked image, the preflight system 18 will query the user's computer 12 to locate the missing image. Whenever possible, the preflight system 18 will help the user's computer 12 locate 60 the missing resources and then prompt 62 the user to allow upload of the missing resource. In another example, if the print job files are missing fonts in a document, the preflight system 18 will search the user's computer 12 for the missing fonts. If the missing resources are found 60 (in this case the missing fonts), the obtain resources subroutine 56 prompts 62 the user to approve the uploading of the required font(s). After the upload 64 to the preflight system 18, the obtain resources subroutine 56 adds 66 the "missing" resources to the existing print job files, and the obtain resources subroutine 56 is completed 68. The defect correction routine 26 returns to the beginning, with the print job being resubmitted 20.

If the missing resources are not found 70 within the user's computer 12, the obtain resources subroutine 56 prompts 72 the user to obtain and submit the missing resources. If the user is able to obtain the missing resources and submits 74 the same, the obtain resources subroutine 56 adds the "missing" resources to the existing print job files, the obtain resources subroutine is completed. The defect correction routine returns to the beginning, with the print job being resubmitted 20. If the user is unable to obtain the missing resources 76, the print job is terminated 46.

If the print job file is not missing resources 78, the defect correction routine 26 queries 80 whether the print job files include defects that can be manually corrected. If no manual corrections are required 82, the preflight system 18 sends 83 the print job to the printer system 84 for action by the next step in the printer system workflow. For example, an automated prepress system of the printer system may take action on the print job file. If the print job files include defects that can be manually corrected 86, the defect correction routine 26 initiates the manual-correct subroutine 88.

In the manual-correct subroutine 88, the preflight system 18 determines 90 whether the system 18 supports the print job source application file format used by the print buyer/user to initially create the print job. If the user's print job source application file format is not supported 92 by the preflight system 18, the print job is terminated 46. If the user's print job file format is supported 94 by the preflight system 18, the manual-correct subroutine generates 96 print job and application specific scripts that will correct the defects and then transmits 98 the scripts to the print buyer/user's computer 12. The print buyer's computer 12 executes 100 the scripts, thereby correcting the defects. The manual-correct subroutine then prompts 102 the user to allow upload 104 of the corrected print job files. The uploaded print job files are treated as a new print order submittal 20, reinitiating the defect correction routine 26.

In an example of the manual-correct subroutine, a print buyer/user submits 20 a PDF document created using InDesign software running on Mac OS operating system. The preflight system 18 determines 90 that the submitted print job source application format is supported, but that the print job requirements necessitate a bleed and the print job files do not contain a bleed. In this example, the manual-correct subroutine would generate 96 an InDesign script, to add the missing bleed in the InDesign software and to print the document to a file, and an AppleScript (MacOS-specific macro) to control the conversion of the InDesign print file to a PDF file using Acrobat Distiller. The manual-correct subroutine also creates an AppleScript macro to oversee handling of executing the various scripts in the print buyer/user's computer 12 and the handling of the user interaction and print job upload. The manual-correct subroutine then transmits 98 the InDesign script and AppleScript macros to the print buyer/user's computer 12 and prompts for permission to execute the files. The print buyer/user's computer 12 grants permission by executing 100 the AppleScript to oversee the document correction, which passes the InDesign script to InDesign and instructs InDesign to execute the script. The InDesign script opens the print job source files, modifies the document size to support bleeds, adds image data to the bleed, changes print driver settings to those specified in the job ticket, and prints the job to file. The AppleScript macro for overseeing the document correction executes the AppleScript that controls the conversion of the InDesign print file to a PDF file. This AppleScript transmits the print file created by the InDesign script to Distiller along with the preferred PDF conversion settings from the manual-correct subroutine and instructs Distiller to create a new PDF file. The AppleScript that oversees the document correction prompts 102 the user to approve the updated job for upload. If the user approves the updated job for upload, the AppleScript then instructs the user's computer system 12 on how to upload 104 the new PDF file. At most, the print buyer/user would simply need to approve execution, preview the revised print job, and approve the upload. The manual-correct subroutine 88 dynamically creates the operating system files, the document creation software files, and as many application-specific scripts as are required to automatically correct problems found in the submitted print job files. The manual-correct subroutine also creates a script that will upload the newly created file to the correct location and associate it with the original job without user intervention.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of automatic correction of defects located in print jobs submitted by print buyers to a print vendor having a preflight system having a defect correction routine for performing the method, the defect correction routine:

assigning a job ID to the print job;

determining the format of the print job files;

automatically comparing the print job files to the file formats supported by the preflight system;

determining whether the print job files are non-compliant with an associated file format supported by the preflight system in a manner that can be automatically corrected without user intervention;

automatically initiating an auto-correct subroutine if the print job file content is non-compliant with the associated file format in a manner that can be automatically corrected;

querying whether the print job file is missing any resources;

automatically initiating a obtain resources subroutine if the print job file is missing resources, whereas the obtain resources subroutine comprises:

querying the print buyer's computer for the missing resources;

prompting the print buyer to allow the print buyer's computer to upload the missing resource, if the missing resource is located on the print buyer's computer; or prompting the print buyer to find the missing resources, if the missing resource is not located on the print buyer's computer;

querying whether the print job files include defects that can be manually corrected;

initiating a manual-correct subroutine if the print job files include defects that can be manually corrected; and sending the print job to the printer workflow if no manual corrections are required.

2. The method of claim 1 wherein the auto-correct subroutine comprises:

creating a new auto-corrected print job file conforming the structure of the non-compliant print job file with the associated file format;

querying the print buyer to accept the auto-corrected print job file; and terminating the print job if the print buyer does not accept the auto-corrected print job file; or returning to the defect correction routine if the print buyer accepts the auto-corrected print job files.

3. The method of claim 2 wherein the auto-correct subroutine also comprises;

retaining the non-compliant print job file; and presenting the user the uncorrected non-compliant print job files and the auto-corrected print job files when querying the print buyer.

4. The method of claim 1 wherein the obtain resources subroutine also comprises the preflight system assisting the print buyer's computer locate the missing resources.

5. The method of claim 1 wherein the obtain resources subroutine also comprises the preflight system searching the print buyer's computer for the missing resources.

6. The method of claim 1 wherein the obtain resources subroutine also comprises:

uploading the missing resources located on the print buyer's computer or found by the print buyer;

the preflight system adding the missing resources to the print job files; and the preflight system resubmitting the print job.

7. The method of claim 1 wherein if the missing resources are not found within the print buyer's computer and the print buyer is unable to obtain the missing resources, the preflight system terminates the print job.

8. The method of claim 1 wherein the manual-correct subroutine comprises the preflight system:

determining whether the preflight system supports the print job file format; and terminating the print job if the print job file format is not supported by the preflight system; or generating print job and application specific scripts to correct the defects if the print job file format is supported by the preflight system.

9. The method of claim 8 wherein the manual-correct subroutine also comprises:

the preflight system transmitting the scripts to the print buyer's computer; and the print buyer's computer executing the scripts to correct the defects.

10. The method of claim 9 wherein the manual-correct subroutine further comprises:

the preflight system prompting the print buyer to approve upload of the corrected print job files; and the print buyer's computer uploading the corrected print job files as a new print order submittal.

11. A method of automatic correction of defects located in print jobs submitted by print buyers through the Internet to a print vendor having a preflight system, the method comprising:

the preflight system assigning a job ID to the print job;

the preflight system determining the format of the print job files;

the preflight system automatically comparing the print job files to the file formats supported by the preflight system;

the preflight system determining whether the print job files are non-compliant with an associated file format supported by the preflight system in a manner that can be automatically corrected;

wherein if the print job file content is non-compliant with the associated file format in a manner that can be automatically corrected:

the preflight system automatically creates a new auto-corrected print job file conforming the structure of the non-compliant print job file with the associated file format;

the preflight system queries the print buyer to accept the auto-corrected print job file; and the preflight system terminates the print job if the print buyer does not accept the auto-corrected print job file;

the preflight system querying whether the print job file is missing any resources;

wherein if the print job file is missing resources:

the preflight system automatically queries the print buyer's computer for the missing resources;

the preflight system prompts the print buyer to allow the print buyer's computer to upload the missing resource, if the missing resource is located on the print buyer's computer; or the preflight system prompts the print buyer to find the missing resources, if the missing resource is not located on the print buyer's computer;

the preflight system querying whether the print job files include defects that can be manually corrected;

wherein if the print job files include defects that can be manually corrected:

the preflight system determining whether the preflight system supports the print job file format; and the preflight system terminating the print job if the print job file format is not supported by the preflight system; or the preflight system generating print job and application specific scripts to correct the defects if the print job file format is supported by the preflight system; and the preflight system sending the print job to the printer if no manual corrections are required.

12. The method of claim 11 wherein if the print job file content is non-compliant with the associated file format in a manner that can be automatically corrected, the method also comprises;

the preflight system retaining the non-compliant print job file; and the preflight system presenting the user the uncorrected non-compliant print job files and the auto-corrected print job files when querying the print buyer.

13. The method of claim 11 wherein if the print job file is missing resources, the method also comprises the step of the preflight system assisting the print buyer's computer locate the missing resources.

14. The method of claim 11 wherein if the print job file is missing resources, the method also comprises the step of the preflight system searching the print buyer's computer for the missing resources.

15. The method of claim 11 wherein if the print job file is missing resources, the method also comprises:

the print buyer uploading the missing resources located on the print buyer's computer or found by the print buyer;

the preflight system adding the missing resources to the print job files; and the preflight system resubmitting the print job.

16. The method of claim 15 wherein if the missing resources are not found within the print buyer's computer and the print buyer is unable to obtain the missing resources, the preflight system terminates the print job.

17. The method of claim 11 wherein if the print job files include defects that can be manually corrected, the method also comprises:

the preflight system transmitting the scripts to the print buyer's computer; and the print buyer's computer executing the scripts to correct the defects.

18. The method of claim 17 further comprising:

the preflight system prompting the print buyer to approve upload of the corrected print job files; and the print buyer's computer uploading the corrected print job files as a new print order submittal.

19. A preflight system comprising:

a computer that stores print jobs submitted by print buyers;

a source application format database stored in the computer, the database containing data on source application file formats supported by the preflight system;

an analyzer that assigns a job ID to each print job;

automatically compares the print job files to the file formats supported by the preflight system;

determines whether the print job files are non-compliant with an associated file format supported by the preflight system in a manner that can be automatically corrected;

automatically corrects the print job files without user intervention if the print job file content is non-compliant with the associated file format in a manner that can be automatically corrected;

queries whether the print job file is missing any resources;

automatically obtain resources if the print job file is missing resources, whereas obtaining resources comprises:

querying the print buyer's computer for the missing resources;

prompting the print buyer to allow the print buyer's computer to upload the missing resource, if the missing resource is located on the print buyer's computer; or prompting the print buyer to find the missing resources, if the missing resource is not located on the print buyer's computer;

queries whether the print job files include defects that can be manually corrected;

generates print job and application specific scripts to correct the defects that can be manually corrected; and sends the print job to the printer workflow if no manual corrections are required.

* * * * *